United States Patent
Webb

(10) Patent No.: US 9,129,136 B2
(45) Date of Patent: Sep. 8, 2015

(54) SYSTEM AND METHOD FOR VERIFYING THE INTEGRITY OF READ-ONLY COMPONENTS IN DEPLOYED MIXED-MODE APPLICATIONS

(75) Inventor: Peter Hartwell Webb, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 1086 days.

(21) Appl. No.: 11/880,417

(22) Filed: Jul. 19, 2007

(65) Prior Publication Data

US 2007/0266382 A1 Nov. 15, 2007

Related U.S. Application Data

(63) Continuation of application No. 11/182,163, filed on Jul. 15, 2005.

(51) Int. Cl.
  *G06F 9/44* (2006.01)
  *G06F 21/64* (2013.01)
  *G06F 21/51* (2013.01)

(52) U.S. Cl.
  CPC ............... *G06F 21/64* (2013.01); *G06F 21/51* (2013.01)

(58) Field of Classification Search
  CPC .................................. G06F 21/64; G06F 21/51
  USPC ................ 713/176, 193–194; 726/26–27, 30; 717/126–127
  See application file for complete search history.

(56) References Cited

U.S. PATENT DOCUMENTS

| | | | |
|---|---|---|---|
| 5,692,047 A * | 11/1997 | McManis | 713/167 |
| 5,892,904 A | 4/1999 | Atkinson et al. | |
| 6,253,324 B1 | 6/2001 | Field et al. | |
| 6,334,189 B1 * | 12/2001 | Granger et al. | 726/26 |
| 6,367,012 B1 | 4/2002 | Atkinson et al. | |
| 6,647,495 B1 * | 11/2003 | Takeuchi et al. | 713/189 |
| 6,668,325 B1 * | 12/2003 | Collberg et al. | 713/194 |

(Continued)

FOREIGN PATENT DOCUMENTS

WO  WO-02/01351 A2  1/2002

OTHER PUBLICATIONS

Compact Disks: What, Why and How|https://www.google.com/url?paf=&q=http://publications.drdo.gov.in/ojs/index.php/djlit/article/download/3574/1986&usg=AFQjCNHDVfgvzqW72xTnSwDq0xhPA_jnTg|Bansaletal.|2002|pp. 17-27.*

(Continued)

*Primary Examiner* — Mahfuzur Rahman
(74) *Attorney, Agent, or Firm* — Harrity & Harrity, LLP

(57) ABSTRACT

A method of ensuring the integrity of read-only components in deployed mixed-mode applications that includes generating a digital fingerprint prior to the deployment of a mixed-mode application is discussed. The digital fingerprint is based on a read-only component in the mixed-mode application and uniquely identifies the read-only component. The method also deploys the mixed-mode application and the digital fingerprint. Additionally, the method verifies, at execution time by using the digital fingerprint, that the read-only component in the mixed-mode deployed application that served as the basis for the digital fingerprint is identical to the same read-only component originally packaged with the mixed-mode application.

15 Claims, 5 Drawing Sheets

(56) References Cited

U.S. PATENT DOCUMENTS

| | | | | |
|---|---|---|---|---|
| 6,973,646 | B1* | 12/2005 | Bordawekar et al. | 717/146 |
| 6,976,167 | B2 | 12/2005 | Nenashev | |
| 7,237,123 | B2 | 6/2007 | LeVine et al. | |
| 7,243,236 | B1 | 7/2007 | Sibert | |
| 7,287,166 | B1* | 10/2007 | Chang et al. | 713/187 |
| 7,350,204 | B2* | 3/2008 | Lambert et al. | 717/172 |
| 7,590,863 | B2* | 9/2009 | Lambert | 713/189 |
| 7,600,125 | B1* | 10/2009 | Stringham | 713/176 |
| 7,685,596 | B1 | 3/2010 | Webb et al. | |
| 7,689,827 | B2* | 3/2010 | Sibert | 713/176 |
| 8,046,777 | B2 | 10/2011 | Webb et al. | |
| 2001/0051928 | A1* | 12/2001 | Brody | 705/52 |
| 2002/0046345 | A1* | 4/2002 | Takeuchi et al. | 713/190 |
| 2004/0025022 | A1* | 2/2004 | Yach et al. | 713/176 |
| 2004/0083462 | A1* | 4/2004 | Gschwind et al. | 717/140 |
| 2004/0177243 | A1* | 9/2004 | Worley, Jr. | 713/2 |
| 2005/0262576 | A1* | 11/2005 | Gassoway | 726/30 |
| 2006/0047958 | A1* | 3/2006 | Morais | 713/166 |
| 2006/0143477 | A1 | 6/2006 | Stevens | |
| 2007/0016888 | A1 | 1/2007 | Webb | |
| 2007/0234070 | A1* | 10/2007 | Horning et al. | 713/190 |
| 2007/0277037 | A1* | 11/2007 | Langer | 713/176 |

OTHER PUBLICATIONS

European Office Action for Application No. 06787188.9, dated Jul. 29, 2011.

"Establishing Trust for Downloaded Software," retrieved online from: http://docs.sun.com/source/816-6171-10/owp.htm, in 2007.

International Search Report for Application No. PCT/US2006/027246, dated Oct. 20, 2006.

* cited by examiner

SYSTEM AND METHOD FOR VERIFYING THE INTEGRITY OF READ-ONLY COMPONENTS IN DEPLOYED MIXED-MODE APPLICATIONS

RELATED APPLICATIONS

The present application claims the benefit under 35 U.S.C. §120 and is a continuation of U.S. application Ser. No. 11/182,163, filed Jul. 15, 2005, now U.S. Publication No. 2007/0016888 which is hereby incorporated herein by reference in its entirety. The present application is related to applications "Calling of Late Bound Functions From an External Program Environment," filed Jun. 2, 2005, U.S. application Ser. No. 11/144,411, and "Self-Contained Virtual File System Including Executable Content," filed Sep. 1, 2004, U.S. application Ser. No. 10/932,512.

FIELD OF THE INVENTION

The illustrative embodiment of the present invention relates generally to the deployment of mixed-mode applications, and more particularly to the verification of the integrity of at least a portion of machine executable code and other read-only components included in a deployed mixed-mode application.

BACKGROUND

Deployable applications include a mixture of executable code and optional data files. The executable code is derived from human readable source code and is usually generated in a non-human readable format (referred to herein as "executable machine code"). A "mixed-mode" application includes both executable machine code components suitable for direct execution by computer hardware and a combination of human-readable source code and (typically) non-human-readable pseudo-code suitable for indirect execution in conjunction with a virtual machine (e.g. Java bytecode, .NET MSIL code, MATLAB M-code, MATLAB P-code, etc). It should be specifically noted that the term "pseudo-code" is used herein to refer to code executable by a virtual machine rather than the alternative meaning of informally written program code. When mixed-mode applications contain human-readable source code, the source code is typically translated to pseudo-code before execution by the virtual machine. Although the executable machine code is generated in a non-human readable format, each executable machine code component is accessible through a well-defined interface which can be revealed through the use of commonly available tools. Other read only components of the deployed application may be similarly vulnerable. For example, data stored in industry-standard format is easily modified by a malicious entity.

Unfortunately, the fact that the executable machine code components are accessible through well-defined interfaces presents a security issue. Malicious entities may replace executable machine code components with other units using the same interfaces. One possible approach to this security vulnerability is to encrypt the executable machine code as part of the deployment of the mixed-mode application. However, the additional computational overhead associated with the encryption and decryption process for the machine executable code frequently represents an unacceptable reduction in application performance or increased security risk since an encrypted executable machine code component can't be loaded by the operating system until it is decrypted and that exposes it to attack. Although the source code and pseudo-code may also be accessed through interfaces, the access does not present the same security problem as does the access to the executable machine code since the pseudo-code runs in a virtual machine, and is free to have a format independent of the hardware-specific format required of "true" executable code, thus allowing it to be stored in an encrypted or otherwise secure form. Since the virtual machine which executes the pseudo-code has complete control over the process of loading and executing the source code and pseudo-code, there is no requirement that source code or pseudo-code be decrypted on disk before being loaded. Thus, entire source code and pseudo-code files or functions may be encrypted without the vulnerabilities associated with the encryption of executable machine code components. Furthermore, source code and pseudo-code files are often much smaller than executable machine code components, greatly reducing the computational effort required to encrypt and decrypt them. Note, however, that the techniques of this invention could equally well be applied to source code or pseudo-code files or functions, should such application produce computational benefits. Accordingly, because of these security issues with deploying native executable machine code components, it would be desirable to have a mechanism through which vendors of virtual machines can verify that the native executable machine code components in a mixed-mode application have not been tampered with by an outside entity and is in its original deployed condition prior to being executed in the virtual machine.

BRIEF SUMMARY

The illustrative embodiment of the present invention ensures the integrity of executable machine code components packaged in a mixed-mode application. A digital fingerprint is generated based on the contents of at least one executable machine code component in the mixed-mode application. The digital fingerprint is written into an authorization file which is encrypted and deployed with the mixed-mode application. The native executable machine code component included in the mixed-mode application is not encrypted. Prior to execution of the mixed-mode application, the execution environment generates a second digital fingerprint based on the same executable machine code component in the deployed application that was used to generate the first digital fingerprint and compares the second digital fingerprint to the digital fingerprint stored in the authorization file that was generated prior to the deployment of the mixed-mode application (after decrypting it). If the digital fingerprints are identical, the executable machine code component has not been tampered with or otherwise altered and the execution environment proceeds with executing the mixed-mode application.

In one aspect of the illustrative embodiment of the present invention, a method of ensuring the integrity of read-only components in a deployed mixed-mode application includes generating at least one digital fingerprint prior to the deployment of a mixed-mode application. The at least one digital fingerprint uniquely identifies a read-only component in the mixed-mode application. The mixed-mode application includes at least one executable machine code component suitable for direct execution by computer hardware and a collection of source code and pseudo-code suitable for indirect execution by a virtual machine. The method also deploys the mixed-mode application and the at least one digital fingerprint.

In another aspect of the illustrative embodiment, a system for ensuring the integrity of deployed mixed-mode applications includes a mixed-mode application that includes at least one executable machine code component suitable for direct execution by computer hardware and a collection of source code and pseudo-code suitable for indirect execution by a virtual machine. The system also includes a deployment facility for packaging and deploying the mixed-mode application to an execution environment. The deployment facility includes a process for creating at least one digital fingerprint prior to the deployment of the mixed-mode application. The digital fingerprint is based on at least one read-only component in the mixed-mode application and also uniquely identifies the at least one read-only component upon which the digital fingerprint is based. The system additionally includes the execution environment for executing the mixed-mode application. The execution environment includes a verification process for verifying at execution time, using the digital fingerprint, that the at least one read-only component in the mixed-mode deployed application is identical to the at least one read-only component originally packaged with the mixed-mode application.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

The illustrative embodiment of the present invention enables the deployment of a mixed-mode application containing executable machine code and other types of read-only components that is verifiable prior to execution. For ease of explanation, the invention will be described with regard to the read-only component being executable machine code, but it is intended that the examples citing the verification of executable machine code be read expansively to include the verification of other types of read-only components such as those identified herein. The use of a separate digital fingerprint that is based on and uniquely identifies the originally deployed executable machine code allows the mixed-mode application to include the executable machine code read in a non-encrypted form. The fact that the executable machine code is in a non-encrypted form greatly speeds up both the generation and the execution of the mixed-mode application since the computational overhead associated with encryption of the executable machine code is absent from the generation process and the computational overhead of decryption of the executable machine code is absent from the execution process. The encrypted digital fingerprint is transmitted with the mixed-mode application to the execution environment. The execution environment creates a second digital fingerprint based on the executable machine code in the deployed mixed-mode application. The second digital fingerprint is created using the same creation process that was used to create the original digital fingerprint and is compared to the (decrypted) original digital fingerprint. Any change in the executable machine code about to be executed in the execution environment from the packaged executable machine code will result in a different digital fingerprint being produced. A comparison of the digital fingerprints that reveals non-identical files causes an error message to be generated and execution of the mixed-mode application to be halted. The illustrative embodiment thus ensures the integrity of the executable machine code in mixed-mode applications without resorting to a non-efficient encryption of the executable machine code.

Figure 1:
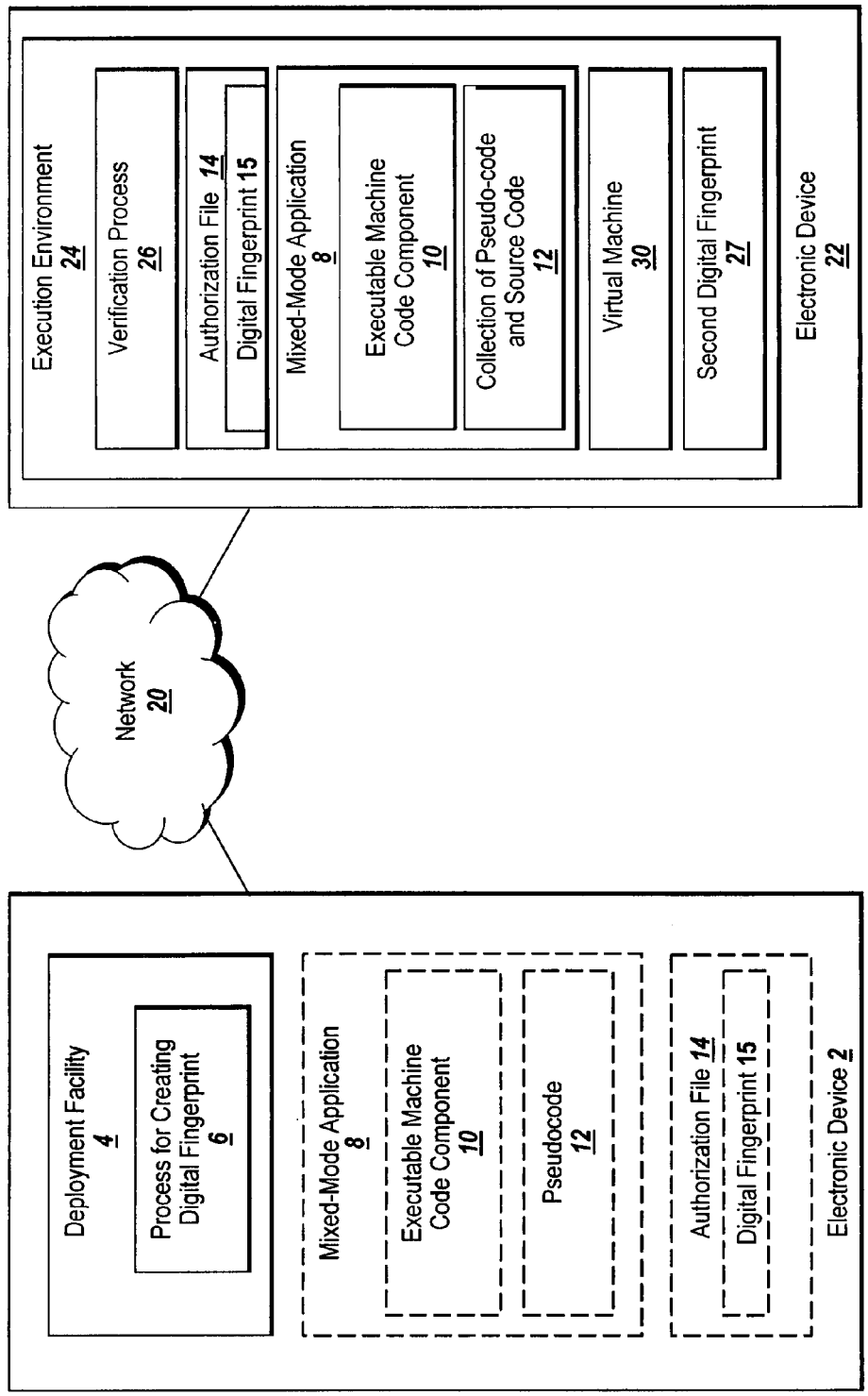
FIG. 1 depicts an environment suitable for practicing the illustrative embodiment of the present invention.

FIG. 1 depicts an environment suitable for practicing the illustrative embodiment of the present invention. An electronic device 2 includes a deployment facility 4. The deployment facility 4 includes a process for creating a digital fingerprint 6. The deployment facility 4 packages executable machine code components 10 of the mixed-mode application derived from a source code file along with a collection of source code and pseudo-code 12 into a mixed-mode application 8 (shown in shadow). The pseudo-code may be JAVA bytecode or .NET MSIL code (Java is a registered trademark of Sun Microsystems, Inc. of Palo Alto, Calif., .NET was developed by Microsoft Corporation of Redmond, Wash.). The source code and pseudo-code may also be MATLAB executable content such as M-files or P-files. (MATLAB is a registered trademark of The MathWorks, of Natick, Mass.) Prior to packaging the mixed-mode application 8, the deployment facility 4 uses the process for creating a digital fingerprint 6 to create an digital fingerprint 15 based on the content of an executable machine code component 10 in the mixed-mode application. The process for creating a digital fingerprint 6 may be a hash function such as SHA-1 or MD5 or some other process that produces a result that uniquely identifies the contents of the input data. The process for creating a digital fingerprint 6 stores the digital fingerprint 15 in an authorization file 14. The authorization file 14 may store more than one digital fingerprint 15. When the authorization file 14 includes more than one digital fingerprint 15 the authorization file contains keys or other lookup elements that uniquely identify the executable machine code component to which each digital signature corresponds.

Following the creation of the digital fingerprint 15, the deployment facility 4 encrypts the digital fingerprint 15 and may package the authorization file 14 holding the digital fingerprint 15 as part of the mixed-mode application 8 when the mixed-mode application is transmitted to an electronic device 22 hosting an execution environment 24. The mixed-mode application 8 may be transmitted over a network 20. The mixed-mode application may alternately be transmitted using a physical medium including, but not limited to CD-ROM, floppy disc, digital versatile disc and magnetic tape. The network 20 may be the Internet, a local area network (LAN), a wide area network (WAN), an extranet, an intranet, a wireless network, a satellite network, or some other type of network. Alternatively, the authorization file 14 may be transmitted separately to the electronic device 22 rather than as part of the mixed-mode application 8. The electronic device 22 may be a server, client, workstation, mainframe, laptop, PDA or some other type of electronic device equipped with a processor and capable of supporting the execution environment 24. It will be appreciated by those skilled in the art that in an alternate implementation, the execution environment 24 may be on the same electronic device 2 as the deployment facility 4.

The execution environment 24 on electronic device 22 executes the mixed-mode application 8. The execution environment 24 includes a verification process 26 and a virtual machine 30. The virtual machine 30, such as a JAVA virtual machine (JVM), or MATLAB Component Runtime (MCR), executes the pseudo-code in the mixed-mode application. However, during the execution of the mixed-mode application 8, as the virtual machine loads an executable machine code component, the illustrative embodiment of the present invention uses the verification process 26 to verify the integrity of the executable machine code component 10 being loaded from the deployed mixed-mode application 8. The verification process 26 creates a second digital fingerprint 27 by duplicating the steps performed by the process 6 for creating a digital fingerprint 15 during the packaging of the mixed-mode application 8. In other words, if a hash function was applied to an executable machine code component 10 in order to generate the digital fingerprint 15 that is created during the packaging of the mixed-mode application 8, the same hash function is applied to the same unit of executable code in the deployed mixed-mode application to produce digital fingerprint 27. If the executable machine code component is unchanged, the application of the hash function should generate an identical result. If a malicious entity has altered the unit of machine code 10 which serves as the basis for the digital fingerprint 15, or the transmission process has altered the code, the second digital fingerprint 27 will be different from the original digital fingerprint and the virtual machine will not finish loading the executable machine code component.

Figure 2:
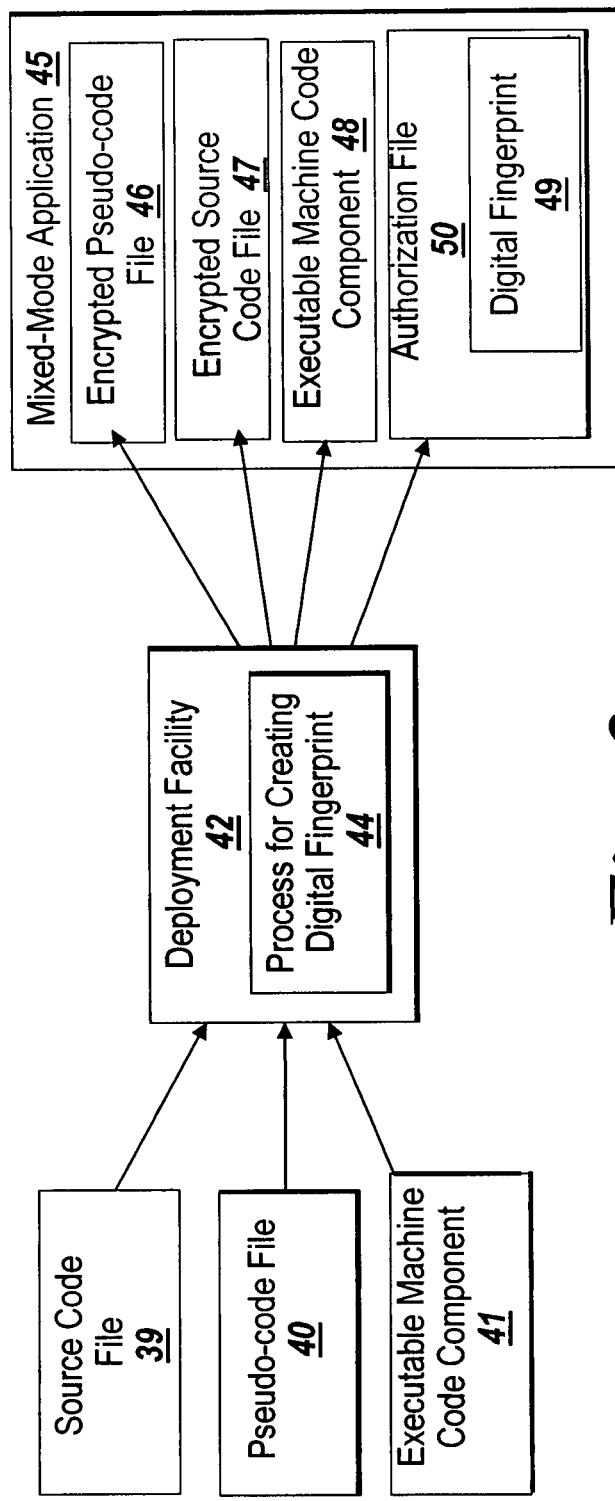
FIG. 2 depicts components packaged by the deployment facility of the present invention.

FIG. 2 depicts the components packaged by the deployment facility 4 of the present invention. A source code file 39 or a pseudo-code file 40 or any combination thereof of one or more source code files and/or pseudo-code files, is processed by the deployment facility 42 which packages the source code or pseudo-code file into the mixed-mode application 45. A source code file 40 may be translated into pseudo-code form by the deployment facility and shipped as such in the mixed-mode application, or it may be included in source code form; in the latter case, the execution environment 24 will typically perform the source code to pseudo-code translation on an as-needed or just-in-time basis. The packaging may include the encryption of the source code file 39 or pseudo code file 40 to produce encrypted source code file 47 or encrypted pseudo-code file 46, respectively. For example, the source code file 39 may be a JAVA file or a MATLAB M file. The deployment facility 42 may also package, into the deployed mixed-mode application 45, one or more user-supplied or virtual-machine-vendor-supplied executable machine code components 41 which are called by the source code files or pseudo-code files or executable machine code components of the mixed-mode application. The deployment facility 42 includes a process for creating a digital fingerprint 44 that is used to create a digital fingerprint 49 that uniquely identifies the executable machine code component upon which it is based. The digital fingerprint 49 is stored in an authorization file 50 which may also be encrypted. The deployment facility may package the encrypted source code file 46, encrypted pseudo-code file 47, an executable machine code component 48 containing the unaltered executable machine code component and an encrypted authorization file 50 along with the digital fingerprint 49 uniquely identifying the executable machine code component 48 into a mixed-mode application 45. It should be noted that the mixed-mode application 45 may have several machine code components and several authorization files holding the digital fingerprints of the machine code components. Alternatively, the digital fingerprints of the several machine code components may be stored in a single authorization file with information that uniquely identifies the executable machine code components to which each digital fingerprint corresponds.

Those skilled in the art will recognize that the deployment facility 42 used by the illustrative embodiment may be implemented in a number of different ways within the scope of the present invention. For example, in one implementation, the deployment facility 42 may also include a compiler for processing the source code file 39 into encrypted pseudo-code file 46. For example, an input source M-file might get transformed into MATLAB pseudo-code files before being deployed with the advantage of reducing the size of the deployed application and improving the load time performance since the execution environment will not have to generate the pseudo-code the first time the source M-file is loaded/executed. In an alternate implementation, the deployment facility 42 may not process the source code file 39, but rather may accept the results of other compilers or processes as input on which to operate in order to package the mixed-mode application 45. Other combinations of the elements described herein will also occur to those skilled in the art.

The mixed-mode application 45 delivered to the execution environment may also vary in its components. For example, the mixed-mode application 45 may include the encrypted source code file 47 or the encrypted pseudo-code file 46, the executable machine code component 48 and the native code authorization file 50 holding a digital fingerprint for the executable machine code component. Alternatively, the executable machine code authorization file 50 may be stored separately from the mixed-mode application file 45 in a manner that makes it accessible to the execution environment. Additionally, the encrypted pseudo-code 46 may be entirely or partially replaced by encrypted or non-encrypted user source code file 39 which the execution environment 24 may optionally transform into pseudo-code before executing them.

Figure 3:
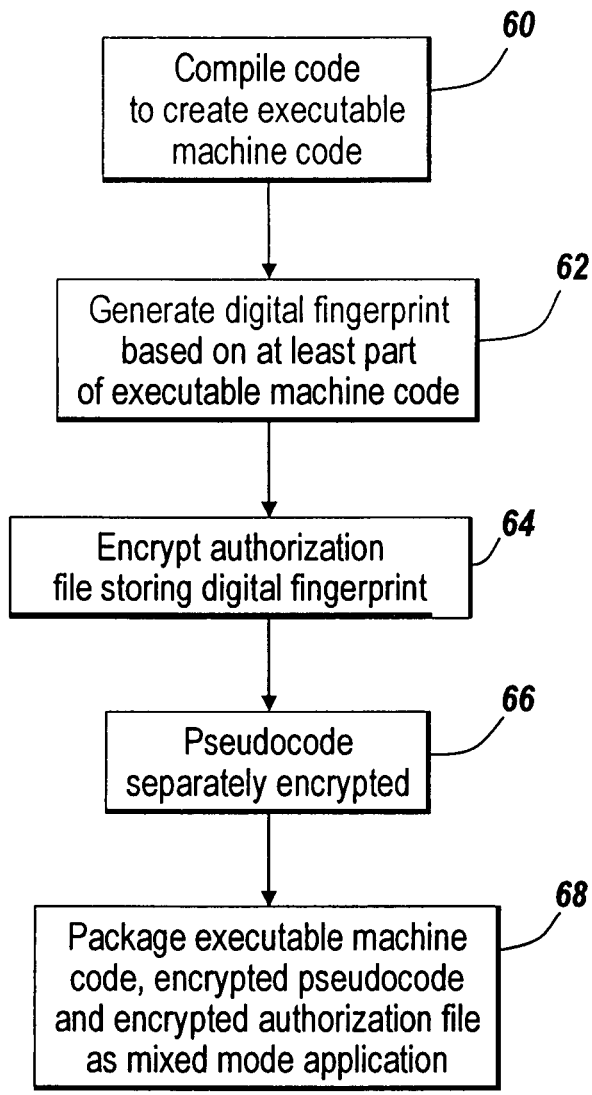
FIG. 3 is a flowchart of the sequence of steps followed by the illustrative embodiment of the present invention to generate a digital fingerprint during the packaging of a mixed-mode application.

The sequence of steps followed by the illustrative embodiment of the present invention to create an authorization file relating to a mixed-mode application may be further explained with reference to FIG. 3. The sequence begins with the compiling of at least one code file (it will be appreciated that a native code object may be built from any number of code files) into at least one executable machine code component (step 60). The deployment facility 4 then generates a digital fingerprint based upon at least a part of the executable machine code derived from the source code file (step 62). The deployment facility may generate the digital fingerprints based on all of the executable machine code components derived from the source code file or only on parts of the executable machine code noted to be of particular significance.

In one aspect of the illustrative embodiment, a digital fingerprint is generated for each executable machine code component, and each such digital fingerprint is stored in a separate authorization file; the name of said authorization files may be deterministically generated from the name of the unit of executable code to allow the execution engine 24 to quickly locate the digital signature corresponding to a particular unit of code. In another aspect of the illustrative embodiment of the present invention, the digital fingerprints for each unit of executable code may be stored in a structured file, such as a relational database. The database may have lookup keys corresponding to the names of the executable units of code, to enable the execution engine 24 to rapidly locate the corresponding digital fingerprint. In either embodiment, the digital fingerprints may be optionally encrypted to prevent malicious entities from modifying them. While the generation of digital fingerprints for each of the executable machine code components in the mixed-mode application will allow the identification of any change in any native executable machine code component subsequent to the packaging of the mixed-mode application, the generation of many digital fingerprints comes with a performance trade-off. More specifically, since the generation of multiple digital fingerprints requires a time-consuming process, the hashing (or other identifying process applied to the executable machine code) to be performed multiple times; the time required therefore grows as the number of and size of the units of executable code increases. As a result, the subsequent verification process will also be based on the larger number of executable machine code components and the comparison will be between two larger groups of data thus slowing down the verification process. Accordingly, it is anticipated that programmers using the illustrative embodiment to ensure the integrity of executable machine code in deployed mixed-mode applications may identify areas of critical read-only portions of the machine code and base the digital fingerprints on just those sections of executable machine code.

Continuing with FIG. 3, following the generation of the digital fingerprints, which may be subsequently stored in one or more authorization files as discussed above, the deployment facility 42 encrypts the authorization file 50 (step 64), before storing them in said files. User source files 40 such as MATLAB M-file may also be encrypted (step 66) and the deployment facility 42 then packages the executable machine code 48, the encrypted authorization file 50 holding at least one digital fingerprint and the encrypted pseudo-code 46 and/or optionally encrypted source code files 39 into a mixed-mode application 45 (step 68). As discussed above, the authorization file 50 holding at least one digital fingerprint may be distributed with the packaged mixed-mode application 45 but not integrated into the same file as the mixed-mode application.

Figure 4:
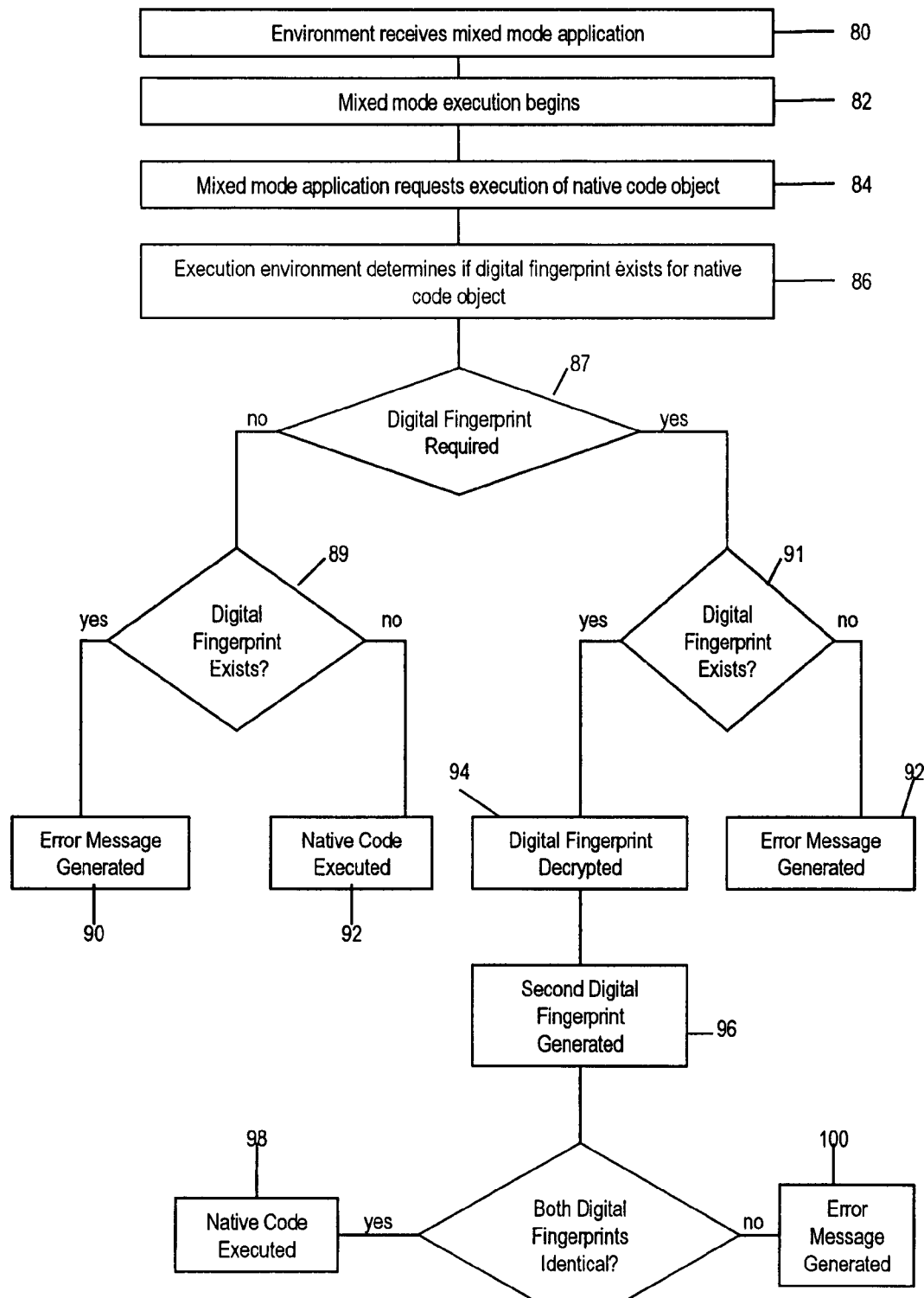
FIG. 4 depicts the sequence of steps followed by the execution environment in the illustrative embodiment of the present invention to verify the integrity of the executable machine code in the mixed-mode application.

The digital fingerprint 15 is utilized by the illustrative embodiment to ensure the integrity of the executable machine code components 10 in the deployed mixed-mode application 8 prior to execution. The sequence of steps by which the digital fingerprint in the authorization file 14 is used in the execution environment 24 is depicted in FIG. 4. The sequence of steps begins when the execution environment 24 receives the mixed-mode application 8 (step 80) and mixed-mode execution begins (step 82). The mixed-mode application 8 requests execution of the native code object (step 84). The execution environment 24 then determines if a digital fingerprint is required and exists for the native code object the mixed-mode application wishes to execute (step 86). If the digital fingerprint is not required (step 87) but exists (step 89), an error message is generated (step 90). If the digital fingerprint is not required (step 87) and does not exist (step 89), the native code object is executed (step 92). Similarly, if the digital fingerprint is required (step 87) and does not exist (step 91) an error message is generated (step 92). If the digital fingerprint is required (step 87) and does exist (step 91), the digital fingerprint is decrypted (step 94), a second digital fingerprint is generated (step 96) and a determination (step 97) is made as to whether the two digital fingerprints are identical. If the digital fingerprints are identical (step 97) the native code object is executed (step 98). Alternatively, if the digital fingerprints are not identical (step 97) an error message is generated (step 100). Those skilled in the art will realize that alternatively execution of the mixed-mode application 8 could be halted without producing an error message or the error message could be generated and the user could be given a choice as to whether to continue with execution. The contents of the error message may also vary with some implementations identifying the location of the altered code that triggered the message.

Figure 5:
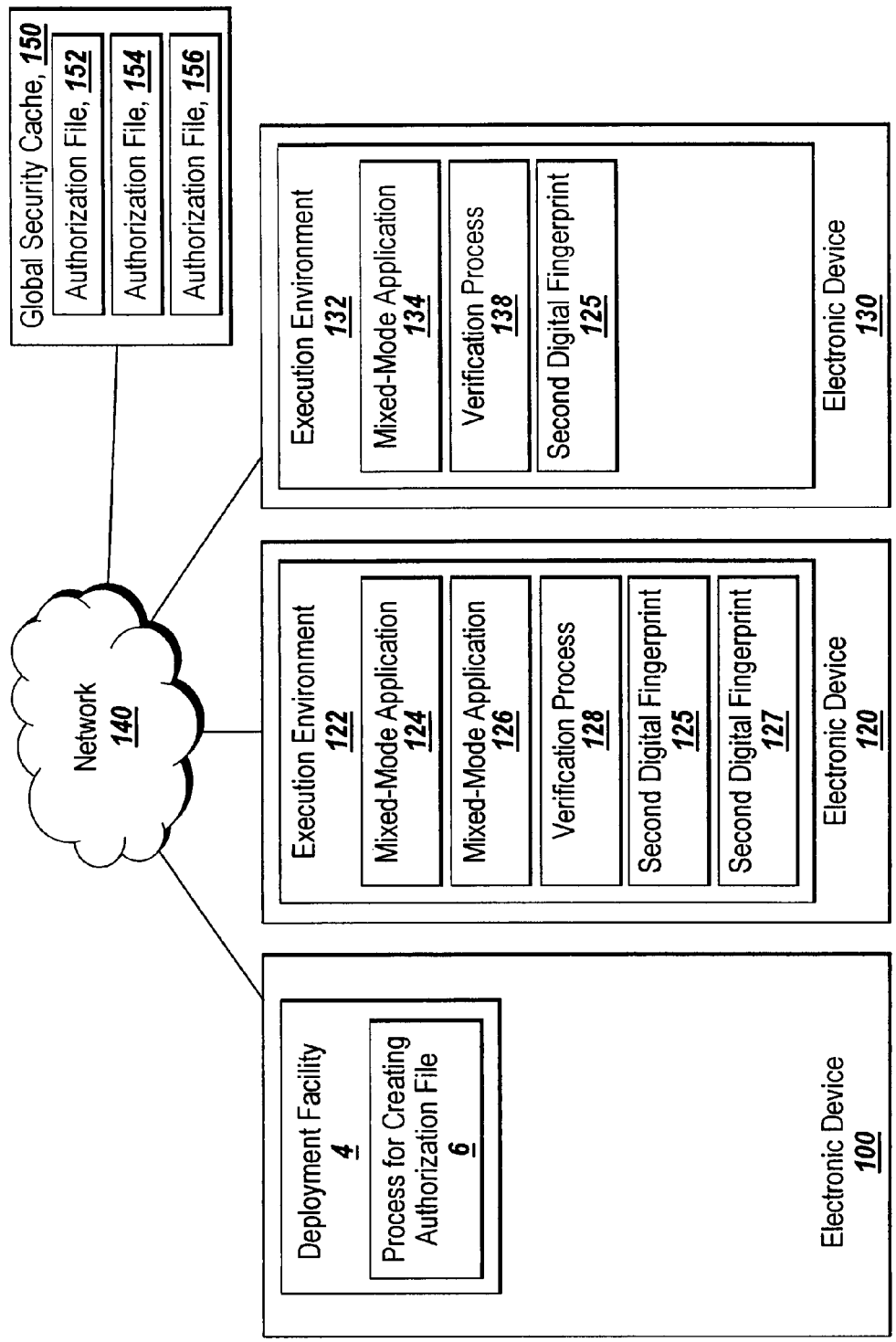
FIG. 5 depicts an alternate environment suitable for practicing the illustrative embodiment of the present invention that utilizes a centralized global security cache for storing authorization files holding digital fingerprints for executable machine code units in deployed mixed-mode applications.

Although the above examples have discussed the illustrative embodiment of the present invention with regard to the distribution of the authorization file either as part of the mixed-mode application or accompanying the mixed-mode application, other implementations are also possible within the scope of the present invention. FIG. 5 depicts an alternate environment in which the authorization files holding digital signatures of executable machine code components in deployed mixed-mode applications are stored in a centralized location. A deployment facility 4 which includes a process for creating an authorization file 6 is located on an electronic device 100. As discussed above, the deployment facility is responsible for packaging mixed-mode applications for deployment to execution environments after creating digital fingerprints based on the identity of executable machine code components within the mixed-mode application. Thus, the deployment facility 4 may deploy mixed-mode application 124 and mixed-mode application 126 to execution environment 122 on electronic device 120. The deployment facility may also deploy mixed-mode application 134 to execution environment 132 on electronic device 130. The mixed-mode applications 124, 126 and 134 may be deployed over a network 140. Prior to deployment, authorization files 152, 154 and 156 are created based on mixed-mode applications 124, 126 and 134 respectively. Rather than distributing the authorization files 152, 154 and 156 with, or integrated into, the mixed-mode applications, 124, 126 and 134, the authorization files are stored at a network accessible location in a global security cache 150. Upon receiving a request to execute mixed-mode application 124 or 126 in execution environment 122, the verification process 128 requests the associated authorization file 152 or 154 and their digital signatures from the global security cache 150 and proceeds to verify the executable machine code component in the mixed-mode application 124 and 126 (by creating second digital fingerprints 125 and 127 respectively and comparing them to the retrieved digital fingerprints). The verification takes place during execution (specifically, when executable machine code components are loaded by mixed-mode applications 124, 126 and 134) preferably using "just-in-time" verification as the executable machine code component is loaded into the execution environment. "Just-in-time" execution has a number of benefits which are discussed further below. Similarly, the verification process 138 in execution environment 132 retrieves the authorization file 156 and its digital signature associated with mixed-mode application 134 from the global security cache 150 to validate the executable machine code component (by creating second digital fingerprint 125 and comparing it to the retrieved digital signature) during execution. The use of the global security cache to hold the authorization files 152, 154 and 156 lessens the amount of data that must be originally distributed to the electronic devices 120 and 130 holding the execution environments 122 and 132. The use of a centralized global security cache 150 provides the additional benefit of a uniform retrieval process in that the mixed-mode applications 124, 126 and 134 are always retrieving authorization files 152, 154 and 156 from the same location. Because the information in the authorization files

152, 154 and 156 is "read-only" (as applications never write to the authorization files), multiple applications, or multiple copies of the same application can access the same authorization files simultaneously without need for any synchronization mechanism to ensure serial, individualized access.

Examining FIG. 5 in more detail, each mixed-mode application 124, 126 and 134 may have multiple authorization files, each of which contains at least one digital fingerprint corresponding to an executable machine code component. With "just-in-time" verification, the digital fingerprint for each executable machine code component is consulted when that component is loaded into the execution environment, rather than at the beginning of execution. This just-in-time verification has a number of benefits. One benefit is that the application only performs verification on those native executable machine code components which get loaded during a given run, therefore minimizing the time required for verification. Another benefit is that the decrypted digital fingerprint never exists on the disk, where it might be vulnerable to malicious tampering. An additional benefit is that there is no separation in time between the verification of the digital fingerprints and the loading of the native executable code. If validation of the digital fingerprint took place at the beginning of execution, a malicious entity could modify the native executable code after verification but before loading, thus circumventing security. Because the verification is performed during the loading process, the "just-in-time" verification is much more secure.

It should be further noted that when using a Global Security Cache 150 the authorization files associated with a given application are uniquely identifiable so that there is never any confusion between authorization files for separate applications, even if the applications have the same name and each such identically named application loads units of executable code with the same names. Any combination of the mixed-mode applications 124, 126 and 134 could all be running on the same electronic device 100, 120 and 130. Alternatively, identical copies of the mixed-mode applications 124, 126 and 134 could be running on one or more electronic devices simultaneously 100, 120 and/or 130 respectively. Additionally, the global security cache may be located in a well-known location. Because the information in the authorization files 152, 154 and 156 (the digital fingerprints) is encrypted, there is no need for a trusted third party or complicated security protocol to broker the application's access to the global security cache. With the use of strong encryption algorithms, the digital fingerprints cannot be altered without the said alteration being detected.

In one aspect of the illustrative embodiment, the present invention may also provide a mechanism to verify the integrity of other read-only components in an application in addition to executable machine code. For example, the digital fingerprints may be used to verify the integrity of "model files," i.e., data files that define a model of a physical or abstract process or device, and a mechanism by which to simulate the action of the process or the operation of the device. More generally, the digital fingerprints may also be used to verify the integrity of data files that are designated as "read-only" and binary files (standalone executable or shared library files) associated with the application that loads the virtual machine which runs the mixed-mode content delivered with the application.

The present invention may be provided as one or more computer-readable programs embodied on or in one or more mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include MATLAB, C, C++, C#, or JAVA. The software programs may be stored on or in one or more mediums as object code.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

I claim:

1. A method comprising:
   receiving a request to execute an application in an execution environment,
   the application being associated with an authorization file that is uniquely identified,
      the receiving the request to execute the application being performed by a device,
      the application comprising a read-only component and pseudo-code,
      the read-only component comprising source code, and
      the pseudo-code being executable by a virtual machine;
   determining, based on receiving the request to execute the application, that a first digital fingerprint is required to execute the application,
      the determining that the first digital fingerprint is required being performed by the device;
   generating a second digital fingerprint based on the read-only component after determining that the first digital fingerprint is required,
      the generating the second digital fingerprint being performed by the device;
   determining whether the application is suitable for execution by comparing, by the device, the first digital fingerprint and the second digital fingerprint; and
   executing the application when the application is determined to be suitable for execution, the executing the application being performed by the device.

2. The method according to claim 1,
   where the application comprises executable machine code as the read-only component,
   where generating the second digital fingerprint comprises:
      generating the second digital fingerprint based on the executable machine code.

3. The method according to claim 1, where the read-only component comprises binary wrapper code.

4. The method according to claim 1, where the read-only component is not encrypted.

5. The method of claim 1, further comprising:
   requesting the first digital fingerprint from a global storage cache,
      the global storage cache being external to the execution environment,
      the global storage cache storing a plurality of digital fingerprints for a plurality of applications,
      the plurality of applications including the application,
      the plurality of digital fingerprints including the first digital fingerprint, and
      the global storage cache being accessible from the execution environment and at least one other execution environment.

6. A non-transitory computer-readable medium storing instructions, the instructions comprising:
one or more instructions that, when executed by at least one computing device, cause the at least computing device to:
receive a request to execute an application in an execution environment,
the application being associated with an authorization file that is uniquely identified,
the application comprising a read-only component and pseudo-code,
the read-only component comprising source code, and
the pseudo-code being executable by a virtual machine;
determine, based on receiving the request to execute the application, that a first digital fingerprint is required to execute the application;
generate a second digital fingerprint based on the read-only component after determining that the first digital fingerprint is required to execute the application;
determine whether the application is suitable for execution by comparing the first digital fingerprint and the second digital fingerprint; and
execute the application based on determining when the application is determined to be suitable for execution.

7. The non-transitory computer-readable medium of claim 6, where the one or more instructions to generate the second digital fingerprint comprise:
one or more instructions that, when executed by the at least one computing device, cause the at least computing device to:
generate the second digital fingerprint based on the source code.

8. The non-transitory computer-readable medium of claim 7, where the source code is encrypted.

9. The non-transitory computer-readable medium of claim 6, where the instructions further comprise:
one or more instructions that, when executed by the at least one computing device, cause the at least computing device to:
receive the application from another computing device,
receive the first digital fingerprint from a global storage cache that received the first digital fingerprint from the other computing device,
the global storage cache being external to the execution environment and the other computing device,
the global storage cache storing a plurality of digital fingerprints for a plurality of applications,
the plurality of applications including the application,
the plurality of digital fingerprints including the first digital fingerprint, and
the global storage cache being accessible from the execution environment and at least one other execution environment.

10. A system comprising:
a memory; and
a processor, at least partially implemented in hardware, to:
receive a request to execute an application,
the application being associated with an authorization file that is uniquely identified,
the application comprising a read-only component and pseudo-code,
the read-only component comprising source code, and
the pseudo-code being executable by a virtual machine;
determine, based on receiving the request to execute the application, that a first digital fingerprint is required to execute the application;
generate a second digital fingerprint based on the read-only component after determining that the first digital fingerprint is required to execute the application;
determine whether the application is suitable for execution by comparing the first digital fingerprint and the second digital fingerprint; and
execute the application when the application is determined to be suitable for execution.

11. The system of claim 10, where the processor is further to:
request and receive the first digital fingerprint from a global storage cache over a network.

12. The system of claim 10, where the processors is further to:
receive the first digital fingerprint from a global storage cache,
the global storage cache being accessible by a plurality of execution environments,
the global storage cache storing a plurality of digital fingerprints for a plurality of applications,
the plurality of applications including the application,
the plurality of digital fingerprints including the first digital fingerprint, and
the encrypted digital fingerprint being deployed by the particular device to the global storage cache.

13. A non-transitory computer-readable medium storing instructions, the instructions comprising:
one or more instructions that, when executed by at least one computing device, cause the at least computing device to:
receive a request to execute an application,
the application being associated with an authorization file that is uniquely identified,
the application comprising a read-only component a read-only component and encrypted pseudo-code,
the read-only component comprising source code,
pseudo-code, of the encrypted pseudo-code, being executable by a virtual machine, and
the encrypted pseudo-code being encrypted by a particular device that provides the application to the at least one computing device;
determine, based on receiving the request to execute the application, that a first digital fingerprint is required to execute the application;
generate a second digital fingerprint based on the read-only component after determining that the first digital fingerprint is required to execute the application;
determine whether the application is suitable for execution by comparing the first digital fingerprint and the second digital fingerprint; and
execute the application when the application is determined to be suitable for execution.

14. The non-transitory computer-readable medium of claim 13, where the instructions further comprise:
one or more instructions that, when executed by the at least one computing device, cause the at least computing device to:
request and receive the first digital fingerprint from a global storage cache over a network.

15. The non-transitory computer-readable medium of claim 14,
where the global storage cache is accessible by a plurality of execution environments, where the global storage cache stores a plurality of digital fingerprints for a plurality of applications,
where the plurality of applications include the application, and
where the plurality of digital fingerprints include the first digital fingerprint.

\* \* \* \* \*